United States Patent [19]

Kawashima et al.

[11] Patent Number: 4,625,817
[45] Date of Patent: * Dec. 2, 1986

[54] METHOD OF ZERO ADJUSTMENT FOR COMBINATORIAL WEIGHING OR COUNTING SYSTEM

[75] Inventors: Kazuo Kawashima; Kazuhiyo Minamida, both of Shiga, Japan

[73] Assignee: Kabushiki Kaisha Ishida Koki Seisakusho, Japan

[*] Notice: The portion of the term of this patent subsequent to Aug. 14, 2001 has been disclaimed.

[21] Appl. No.: 615,967

[22] Filed: May 31, 1984

Related U.S. Application Data

[63] Continuation-in-part of Ser. No. 375,022, Apr. 16, 1982.

[51] Int. Cl.$^4$ .................... G01G 19/22; G01G 13/14
[52] U.S. Cl. .......................................... 177/1; 177/25; 177/165
[58] Field of Search ............................. 177/1, 25, 165

[56] References Cited

U.S. PATENT DOCUMENTS

| | | | |
|---|---|---|---|
| 4,344,492 | 8/1982 | Hirano | 177/25 |
| 4,396,078 | 8/1983 | Minamida et al. | 177/25 X |
| 4,418,772 | 12/1983 | Fukuda | 177/165 X |
| 4,465,149 | 8/1984 | Kawashima et al. | 177/25 X |

Primary Examiner—George H. Miller, Jr.
Attorney, Agent, or Firm—Armstrong, Nikaido, Marmelstein & Kubovcik

[57] ABSTRACT

A method of zero adjustment for a combinatorial weighing or counting system which operates by weighing batches of articles by use of a plurality of weighing machines, computing combinations of the respective weight values of the batches of articles in the individual weighing machines or combinations of the respective numbers of articles, converted from the respective weight values, in the batches, selecting a combination which is equal or the nearest to a set value, and discharging the articles from the weighing machines corresponding to the selected combination, wherein at each time or after a predetermined number of discharges, zero adjustment is automatically made of a selected one of the weighing machines which have discharged their articles, without stopping the operation of the system.

7 Claims, 6 Drawing Figures

METHOD OF ZERO ADJUSTMENT FOR COMBINATORIAL WEIGHING OR COUNTING SYSTEM

This is a continuation-in-part of U.S. patent application, Ser. No. 375,022, filed on Apr. 16, 1982.

This invention relates to a method of automatically making zero adjustment of weighing machines in a combinatorial weighing or counting system without stopping the operation of the system.

Combinatorial weighing or counting comprises weighing batches of articles by n weighing machines, computing combinations of the weight values of the batches of articles or combinations of the numbers of articles, converted from the weight values by dividing the weight value of each batch by the unit weight of articles, selecting a combination which is equal or the nearest to a set weight or set number, and discharging articles according to said selected combination. Conventionally, in such combinatorial weighing or counting system, when it is desired to make zero adjustment of the weighing machines, it is necessary to interrupt weighing or counting by stopping the system to allow zero adjustment to be made with each weighing machine being emptied. Thus, normally, it has been necessary that zero adjustment be made when the power is ON at the start of operation and thereafter at predetermined time intervals by manually stopping the system. With such method, however, it is necessary to stop the system at each adjustment, resulting in low efficiency of weighing or counting operation, and it is very troublesome to make zero adjustment at predetermined time intervals. Further, if the operator forgets to make zero adjustment, the zero point in each weighing machine will deviate during use and in this condition the weighing or counting operation is continued, resulting in erroneous weighing or counting.

With the above in mind, the present invention provides an improved method of making automatic zero adjustment of one of the weighing machines selected for a combination each time a combinatorial weighing or counting operation is performed.

More particularly, the invention provides a method of zero adjustment for use with a combinatorial weighing or counting method which comprises weighing batches of articles by a plurality of weighing machines, computing combinations of the respective weight values of the batches of articles in the individual weighing machines or combinations of the respective numbers of articles, converted from said weight values, in the batches, selecting a combination of weights or numbers which is equal or the nearest to a set value, and discharging articles from the weighing machine corresponding to the selected combination, said zero adjustment method being characterized in that each time articles are discharged, that one of the weighing machines corresponding to a selected combination which is the highest in the number of times of discharge which have been effected since it was zero-adjusted last or in the amount of time which has elapsed, and zero adjustment is made of said selected empty weighing machine.

A further embodiment is disclosed in which a zero adjustment is made after a predetermined number of measurements of weight.

A single weight measurement counter for counting the number of measurements of weight is provided, and each weighing machine having a zero adjustment counter, a zero adjustment flag, and a supply flag corresponding thereto. Each zero adjustment counter will indicate the number of times in which no zero-adjustment of the associated weighing machine is made. That is, each time articles are discharged from weighing machines, all the zero adjustment counters are given an increment (+1), and when a weighing machine to be zero-adjusted is selected, the zero adjustment counter associated with said weighing machine is cleared. Further, the zero adjustment flags serve to designate a weighing machine to be zero-adjusted; thus when a weighing machine to be zero-adjusted is selected, the zero adjustment flag associated with said weighing machine is tuned to "H" and upon completion of the zero adjustment it is turned to "L." The supply flags serve to designate weighing machines to be supplied with articles; thus, only the weighing machines with their flags turned to "H" will be supplied with articles. These control operations are performed by an arithmetic unit commonly called CPU, according to a predetermined program.

According to the present invention, since one of the weighing machines selected for a combination is selected at each time or after a predetermined number of weighing or counting and the selected weighing machine is automatically zero-adjusted during weighing or counting operation, the trouble of stopping the system and manually making zero adjustment each time, as in the past, is eliminated, thus facilitating the operation of the combinatorial weighing or counting system. Further, since zero adjustment is made at each time of weighing or counting, there is no possibility of forgetting to make zero adjustment or of the zero point deviating, so that accurate weighing or counting is ensured.

The above and other objects and features of the present invention will become more apparent from the following description given with reference to the accompanying drawings, in which.

Throughout the figures, like parts are indicated by like reference numerals.

According to the present invention, by making use of the fact that in weighing, computing combinations, and discharging articles from weighing machines corresponding to a combination which satisfies a set value, these weighing machines become empty, a weighing machine which most requires zero adjustment is selected from said empty weighing and then zero adjustment of said selected empty weighing machine is automatically made. The selection of a weighing machine requiring zero adjustment from weighing machines which have discharged their articles and become empty is classified into two ways A and B.

A. The number of times of discharge from each weighing machine is counted, and a weighing machine which is the highest in the number of times of discharge which have been effected since it was zero-adjusted last is selected and zero-adjusted. This is most suitable when articles liable to adhere to the weighing machines are handled, because the higher the number of times of weighing and discharge, the larger the amount adhered and hence the greater the possibility of zero-point deviation.

B. Signals produced at predetermined time intervals, such as start signals S produced from a packaging machine to tell the completion of readinesss for packaging, are counted. This is suitable when the zero point deviates with the lapse of time. An example is where the weight detecting section of the weighing machine is composed of a load cell or the like. This is because there are cases where a load cell or the like has its zero point deviated with the lapse of time.

Figure 1:
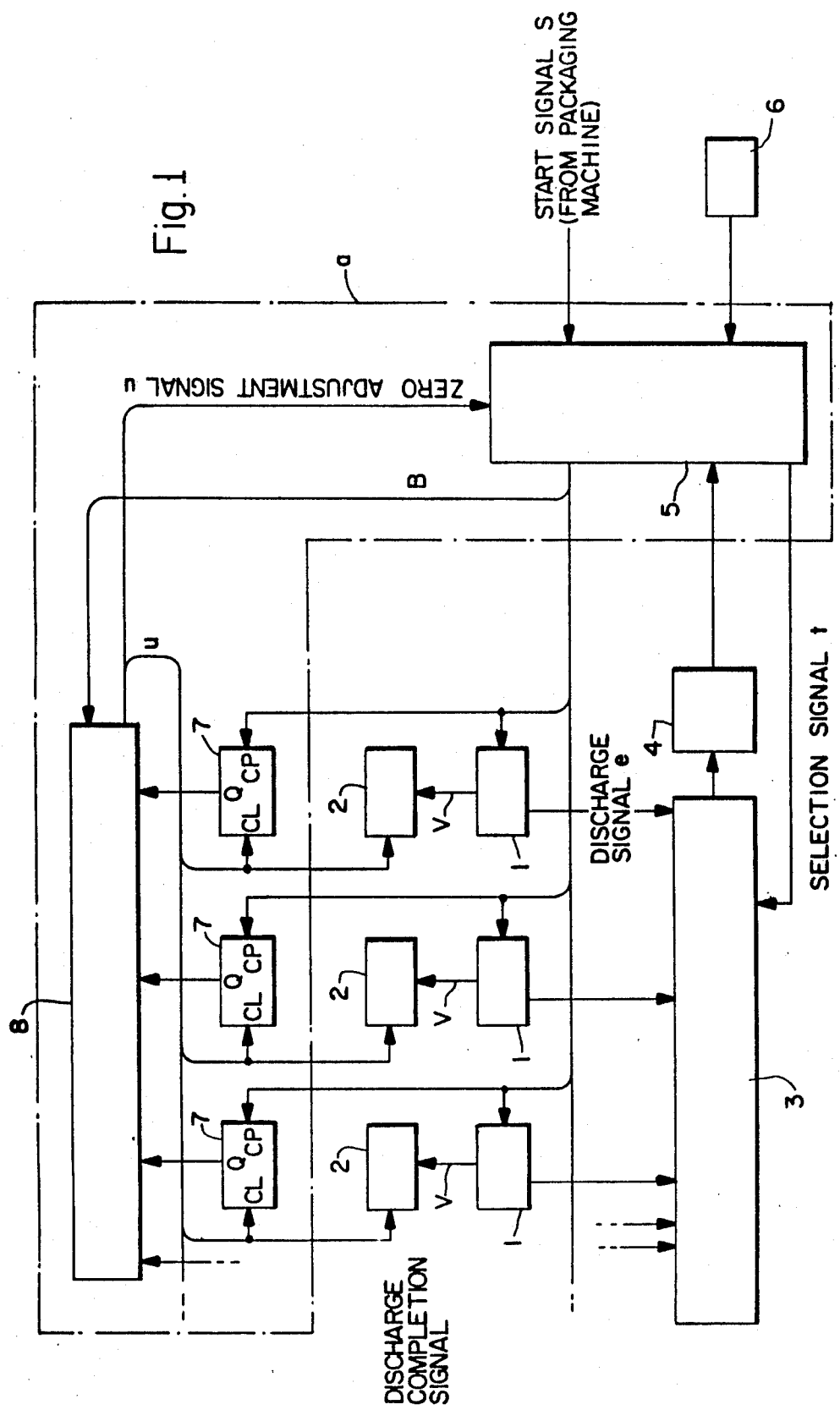
FIG. 1 is a block diagram of a system to which the invention is applied, showing an embodiment of the invention adapted to make zero adjustment of a weighing machine which is the highest in the number of times of discharge which have been effected since it was zero-adjusted last.

First, the case of A where discharge signals are counted will be described. In FIG. 1, the numeral 1 denotes n weighing machines; 2 denotes feeders for feeding articles to the weighing machines 1; 3 denotes a multiplexer composed of analog switches or the like; 4 denotes an A/D converter; 5 denotes an arithmetic unit for storing various data, such as weight values, and for computing combinations; 6 denotes a weight setting section for setting the weight of articles to be discharged; 7 denotes counters associated with the weighing machines 1 for counting the number of times of discharge of articles; and 8 denotes a comparing section for comparing weighing machines which have discharged their articles to pick out a weighing machine which is the highest in the number of times of discharge, so as to output a zero adjustment signal. In addition, the part a surrounded with an alternate long and short dash line is the control section of the invention.

The system shown in FIG. 1 operates as follows.

Figure 2:
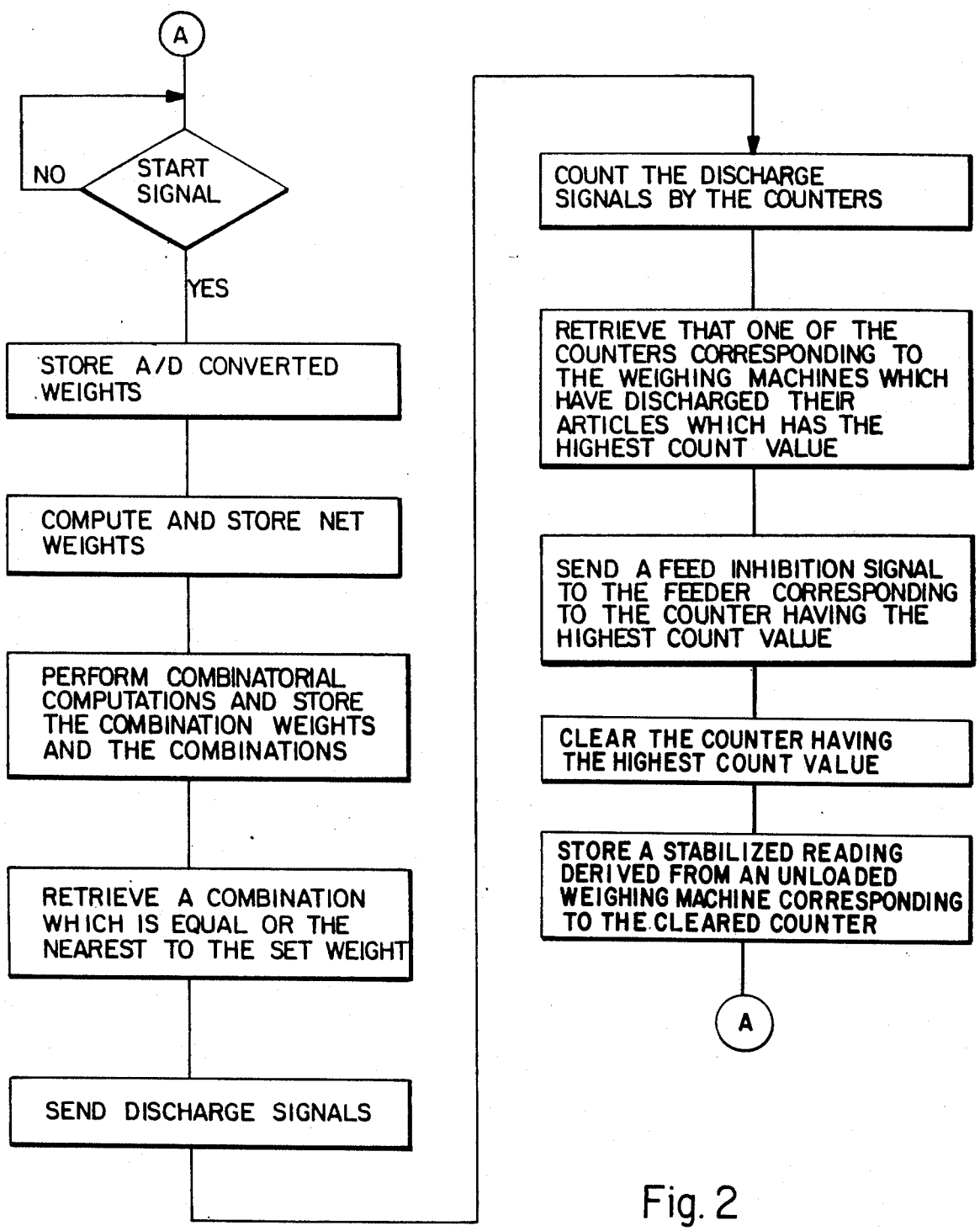
FIG. 2 is a "flowchart" showing a processing procedure in the system of FIG. 1.

When the power is turned on, the arithmetic unit 5 sends a selection signal t to the multiplexer 3, and weight values indicated by the weighing machines, when empty, are read in through the multiplexer 3 and A/D converter 4 and stored as values for zero adjustment. Articles are fed from the feeder 2 to the weighing machines 1 with suitable variations in amount, and all the counters 7 are cleared to zero. By this point of time, a weight value for articles to be discharged has been set by the weight setting section, and then weighing operation is started. Thereafter, the control section a operates according to the "flowchart" shown in FIG. 2. First, the arithmetic unit 5 checks whether a start signal S indicating the completion of readiness for packaging has been sent from the packaging machine. If there is no start signal, it repeats this check, waiting until there is one. When a start signal is sent in, the arithmetic unit 5 judges that there is one, and sends selection signals t in succession to the multiplexer 3 to allow the weight values of articles measured by the weighing machines 1 to pass from the multiplexer 3 to the A/D converter 4, where they are converted into digital signals, and these weight values are stored. Next, the weight values just stored are compensated by the weight values in the empty state stored with respect to the weighing machines 1, i.e., by values for zero adjustment deviated from the zero points. That is, the values for zero adjustment are subtracted from the weight values just stored, to compute the net weights and the latter are stored. Combinations of the net weights in the n weighing machines are computed, and the resulting combination weights and combinations are stored. A combination weight which is equal or the nearest to the set weight for discharge is retrieved from these stored combination weights, and discharge signals e are sent to the corresponding weighing machines 1, the counters 7 and the comparing section 8, whereupon the weighing machines which have received said discharge signals e discharge their articles. Simultaneously therewith, the counters 7 corresponding to the weighing machines which have discharged count the discharge signals e, and increase the count values by 1. The comparing section retrieves the counter 7 which has the greatest count value from the counters 7 corresponding to the weighing machines which has discharged. At this time, since the first weighing has just been effected, the counters 7 corresponding to the weighing machines which have just discharged count 1. In this case, the weighing machines 1 may be numbered, like No. 1, No. 2 and so on, and one which has the smallest number may be selected. When one counter 7 is selected by this retrieval, the comparing section 8 sends a zero adjustment signal u to the arithmetic unit 5 and it also sends said zero adjustment signal u, as a clear signal, to the selected counter 7 and, as a feed inhibition signal, to the feeder 2 for the weighing machine 1 corresponding thereto. Then, feed inhibition is put on said feeder 2 and the counter 7 is cleared to have its count value zeroed. Upon completion of discharge of articles from the weighing machines 1 to which discharge signals e have been sent, these weighing machines send discharge completion signals v to the feeders 2, and articles are fed to the weighing machines 1 except the one corresponding to the feeder on which feed inhibition has been put. During this time, the arithmetic unit 5 detects a change in weight value from the weighing machine 1 which is emptied through the multiplexer 3 and A/D converter 4, and stores it when it becomes stationary and stabilized. Thereafter, this is used as zero adjustment value for the weight value in the weighing machine 1, and with this it follows that zero adjustment of the weighing machine 1 has been made. Then, the operation of the control section a returns to the initial position A for arithmetic processing. It starts the second operation when a packaging-ready completion signal S is sent from the packaging machine. However, at the second following times, one weighing machine 1 remains empty because of zero adjustment. Therefore, whereas combinatorial computations are performed with respect to n weighing machines at the first time, combinatorial computations are performed with respect to (n−1) machines at the second and following times. That is, since one weighing machine 1 is selected and zero-adjusted in each weighing, this weighing machine cannot participate in the next combinatorial weighing. However, at and after the next time, this weighing machine 1 has its feed inhibition removed therefrom, so that it participates in weighing.

The case of B where signals produced at predetermined time intervals, such as start signals S from the packing machine, are counted will now be described.

Figure 3:
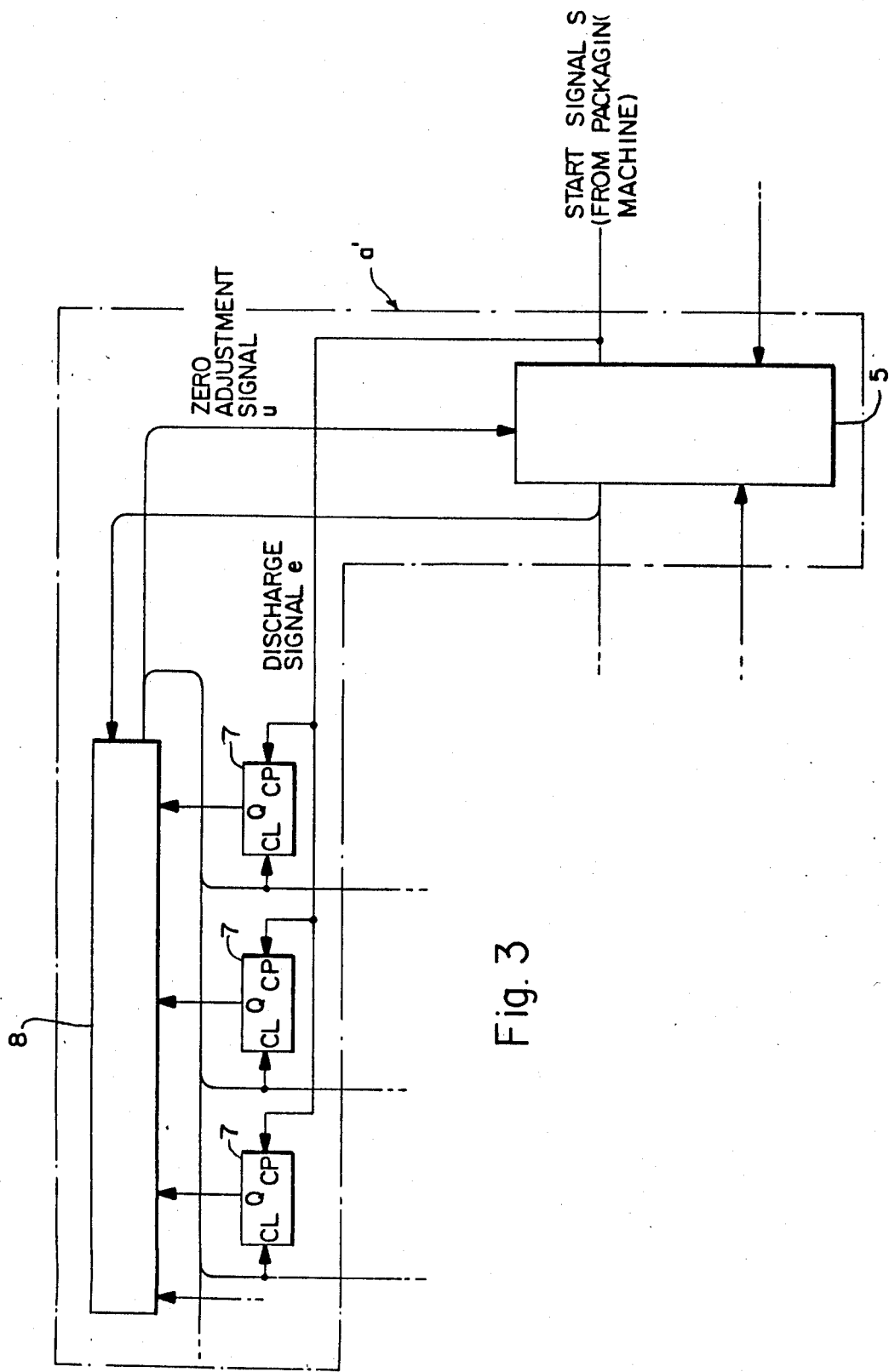
FIG. 3 is a block diagram to which the invention is applied, showing another embodiment of the invention adapted to make zero adjustment of a weighing machine which is highest in the amount of time which has elapsed since it was zero-adjusted last.

FIG. 3 shows an arrangement for performing the same, the only difference thereof from the arrangement shown in FIG. 1 being that the counters 7 count start signals S from the packaging machine; rather than counting discharge signals e. Therefore, FIG. 3 shows only the control section a'.

Figure 4:
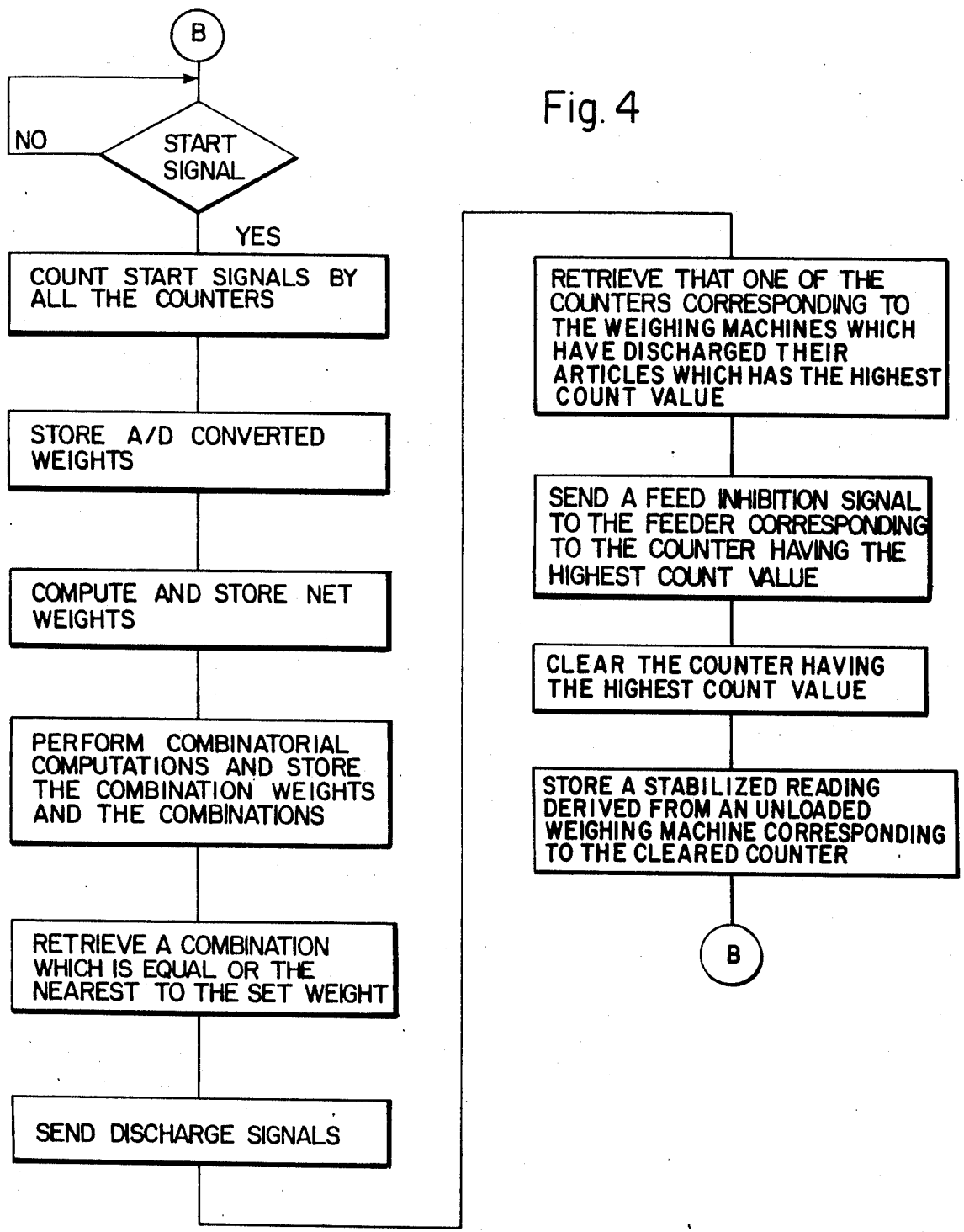
FIG. 4 is a "flowchart" showing a processing procedure in the system of FIG. 3.

In the case of this embodiment, an example of the operation of the control section a' is shown by a "flowchart" in FIG. 4. According to this processing procedure, the counters 7 are counting start signals S, from the packing machine. Therefore, the processing step of checking whether there is a start signal S is followed by the processing step of causing all the counters 7 to count start signals S, unlike the processing procedure shown in FIG. 2, which includes the step of counting discharge signals e. The other processing steps are the same as those described with reference to FIG. 1, and a description thereof is omitted. In the case of the embodiment shown in FIG. 3, as in the case of the embodiment shown in FIG. 1, since one weighing machine 1 is zero-adjusted in each weighing, at the second and following times, combinatorial weighing is performed by (n−1) weighing machines 1. In addition, since this case of B where signals produced at predetermined time intervals are counted is used when deviation of zero point is proportional to the amount of time which has elapsed since zero adjustment was made, it is so arranged that start signals S are counted by all the counters 7 irrespective of discharge of articles. This is different from the case of A where only the corresponding ones of the counters 7 count discharge signals e. That is, the weighing machine 1 to be zero-adjusted is that one of the weighing machines having discharged their articles which is the highest in the amount of time which has elapsed since it was zero-adjusted last. Further, in the embodiment shown in FIG. 3, a clock pulse generating section may be provided for generating clock pulses, e.g., at intervals of 5 seconds and the counters 7 may count said clock pulses instead of start signals S. However, during the time when that one of the counters 7 corresponding to the weighing machines 1 which have discharged their articles which has the highest count value is retrieved, the values of the counters 7 must not change. Therefore, it is necessary that during that time, clock pulses should not be inputted into at least the counters 7 corresponding to the weighing machines 1 which have discharged their articles.

The methods of zero adjustment in the embodiments described above with reference to FIGS. 1 through 4 are such that the weight value outputted when a weighing machine 1 is empty is stored as a zero adjustment value in the arithmetic unit 5 and this value is subtracted when articles are actually weighed, so as to find the net weight. However, other methods of zero adjustment may be contempleted. For example, compensation may be effected within a weighing machine. In that case, a zero adjustment signal u is inputted into a weighing machine instead of the arithmetic unit 5, causing the weighing machine to adjust itself so that its output voltage is O V when it is empty.

In the embodiments described above, there are cases where the counters 7, of which the one having the highest count value is retrieved in the comparing section 8, have the same count value. For example, at the time of initialization after the power is turned on, all the counters 7 have been cleared. Therefore, after articles are discharged in response to the first combinatorial computing operation, the counters corresponding to weighing machines which have discharged their articles have counted the same number in the case of A where discharge signals are counted, and in the case of B where signals produced at predetermined time intervals are counted, all the counters 7 have counted the same number, so that it is impossible to specify which counter has the highest count value. As for measures taken in the case of two or more counters having the same count value, it is possible to number the weighing machines 1, like NO. 1, NO. 2 and so on, and select them in the decreasing or increasing order of the number.

The control sections a and a' of the present invention shown in FIGS. 1 and 3 may have their circuits composed of hardware such as TTL. IC or arranged to function in a software fashion by using a microcomputer.

An additional embodiment of the present invention where a zero adjustment is made after a predetermined number of measurements of weight will now be described.

A single weight measurement counter for counting the number of measurements of weight is provided, and each weighing machine having a zero adjustment counter, a zero adjustment flag, and a supply flag corresponding thereto. Each zero adjustment counter will indicate the number of times in which no zero-adjustment of the associated weighing machine is made. That is, each time articles are discharged from weighing machines, all the zero adjustment counters are given an increment (+1), and when a weighing machine to be zero-adjusted is selected, the zero adjustment counter associated with said weighing machine is cleared. Further, the zero adjustment flags serve to designate a weighing machine to be zero-adjusted; thus when a weighing machine to be zero-adjusted is selected, the zero adjustment flag associated with said weighing machine is turned to "H" and upon completion of the zero adjustment it is turned to "L." The supply flags serve to designate weighing machines to be supplied with articles; thus, only the weighing machines with their flags turned to "H" will be supplied with articles. These control operations are performed by the arithmetic unit 5, commonly called CPU, according to a predetermined program (FIGS. 1 and 3).

Figure 5:
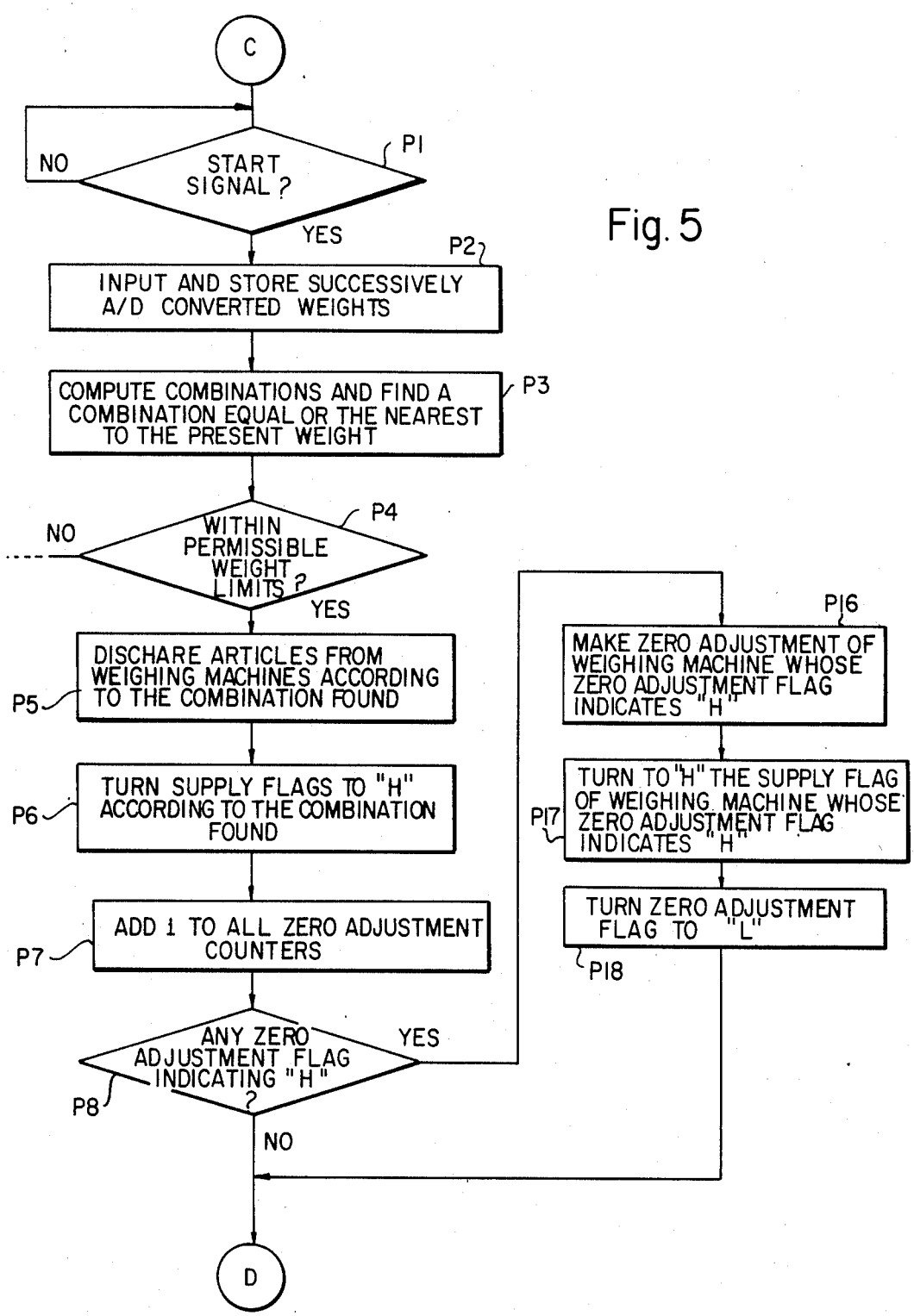
FIG. 5 and 6 combine to form a "flowchart" representing a processing procedure of another embodiment of the instant invention.
Figure 6:
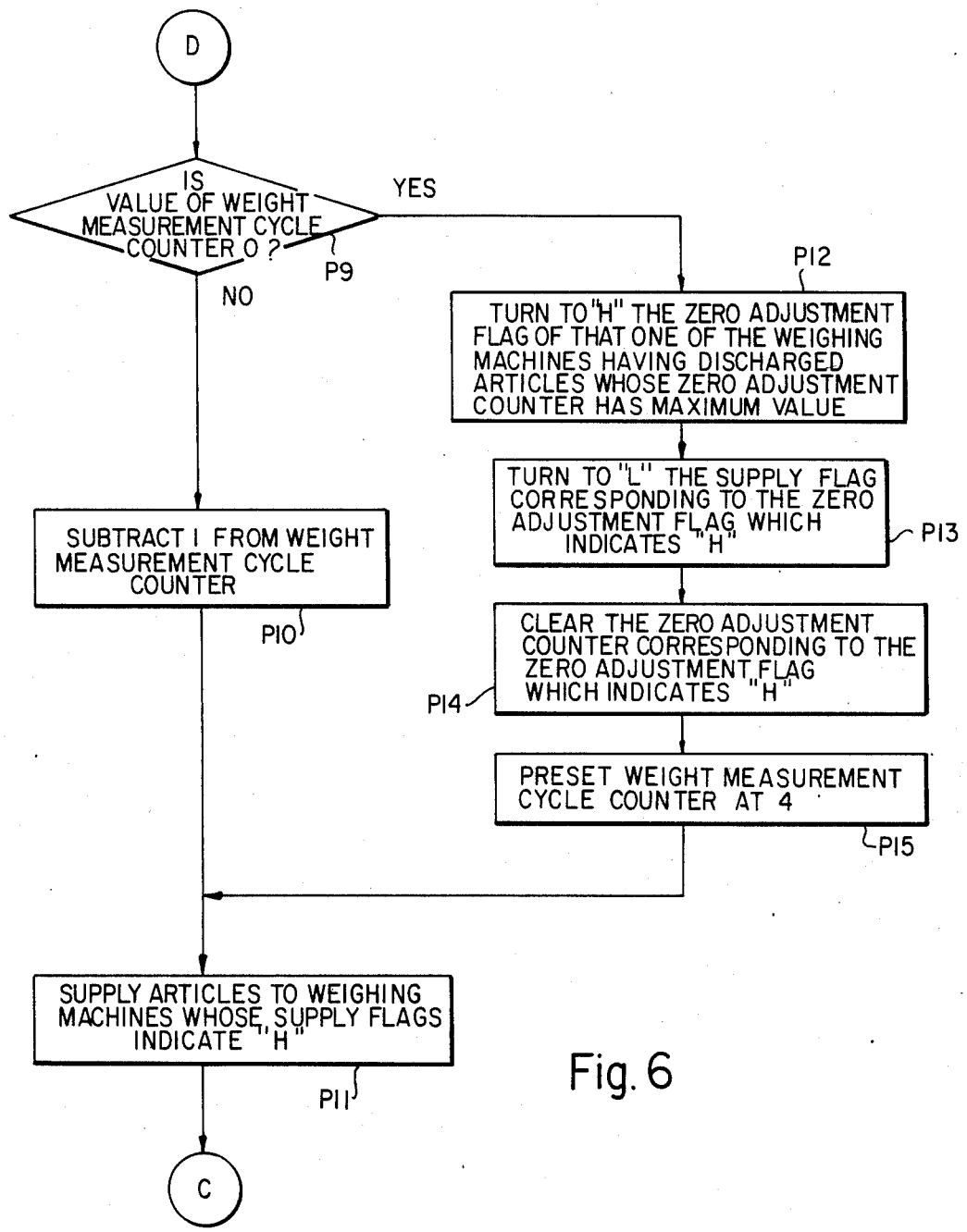

For example, in an instance in which each time 4 cycles of weighing discharge are performed, a zero adjustment will be made of a single weighing machine will now be described with reference to FIGS. 5 and 6. While it is possible to zero adjust more than one weighing machine at the same time, zero adjusting only one weighing machine is the preferred approach.

At step P1, the presence or absence of a start signal from the packaging machine is checked. In the case of the presence of a start signal S, the respective weights, successively A/D converted by the A/D converter 4 through the multiplexer 3, of the contents of all (n) weighing machines 1 are stored at step P2. At step P3, combinations of the aforesaid stored weights are computed and a combination equal to or nearest a preset weight is found. At step P4, whether or not the thus found combination of weights is within the preset permissible weight limits is checked, and if it is within the limits the procedure goes to the next step P5, but if it is outside the limits, for example, three weighing machines having less weights will be supplied with additional articles and the procedure goes back to the step P1. At step P5, articles are discharged from the weighing machines corresponding to the aforesaid combination and at step P6 the supply flags of the weighing machines that have discharged are turned to "H." At step P7, all the zero adjustment counters are given an increment (+1) and at step P8, the status of the zero adjustment flags is checked, and if they are all "L" the procedure goes to the next step P9. The status of whether or not the count value from the weight measurement cycle counter is zero is checked and if it is not zero, e.g., if it is "3," the counter is given a decrement (−1) at the next step P10, so that its count value becomes "2." At step P11, the weighing machines whose supply flags are "H" are supplied with fresh articles and all the supply flags are turned to "L" and the step P1 is executed again.

When the steps P1–P11 are executed a predetermined number of times, i.e., four times in the present example and hence the count value of the weight measurement cycle counter becomes zero, this fact is checked at step P9, from which the procedure then moves to step P12, where the zero adjustment flag of the weighing machine corresponding to that one of the zero adjustment counters of the weighing machines having discharged their articles whose count value is the greatest is turned to "H". Then, in order to prevent this weighing machine from being supplied with articles, the supply flag of the weighing machine whose zero adjustment flag is "H" is turned to "L" at step P13. At step P14, the zero adjustment counter of the weighing machine whose zero adjustment flag is "H" is cleared, and at step P15, "4" is preset in the weight measurement cycle counter, whereupon the procedure moves to step P11. At step P11, articles are supplied to the weighing machines whose supply flags are "H," so that the single weighing machine whose zero adjustment flag is "H" and hence whose supply flag is "L" will not be supplied with articles, thus remaining empty.

Subsequently, the steps P1, P2 and, P3 are executed and at step P3, excluding the single weighing machine whose zero adjustment flag is "H," the remaining (n−1) weighing machines are taken into account when combinations of weights are computed to find a particular combination of weights which is equal or the nearest to the preset weight. If the thus found combination of weights is within the permissible weight limits (step P4), the steps P5–P8 will be executed, and since there is a weighing machine whose zero adjustment flag is "H," the procedure moves from step P8 to step P16. At step P16, a zero adjustment will be made of the weighing machine whose zero adjustment flag indicates "H," that is, the weighing machine which in the last weighing operation was not supplied with fresh articles and remained empty though it discharged its contents. In addition, zero adjustments are made by zero adjustment circuit so that the input voltage on the A/D converter with the weighing machine being empty is zero. Upon completion of zero adjustment, in order to supply fresh articles to the weighing machine in question, the supply flag corresponding to the weighing machine whose zero adjustment flag is "H" is turned to "H" at step P17, and since the zero adjustment has been completed, the zero adjustment flag is turned to "L" at step P18 and the procedure then goes to step P9. Since the count value of the weight measurement cycle counter was preset at "4" in the last weighing operation, its count value will be "3" when the procedure goes from step P9 to step P10. Further, at step P11, the weighing machines whose supply flags are "H" are supplied with fresh articles. That is, the weighing machines which discharged their contents at step P5 and the weighing machine of which a zero adjustment has been made are supplied with fresh articles.

And the steps P1, P2, and P3 are executed. At step P3, since all the weighing machines have articles put therein at step P11, combinations of weights of articles in all the weighing machines are computed. Subsequently, the steps P4–11 are executed. Further, the steps P1–P11 are repeated, and when the count value of the weight measurement cycle counter becomes zero, a zero adjustment will be made of a weighing machine in the next weighing operation in the same manner as above.

As has been described so far, in this embodiment, from weighing machines that have discharged articles, a single weighing machine is selected after each predetermined number of weight measurements (four measurements in the illustrated example), and a zero adjustment of the selected weighing machine is made in such a manner that it is not supplied with fresh articles, remaining empty. Upon completion of the zero adjustment, this weighing machine is supplied with fresh articles and is allowed to be included in the next computation of combinations.

While the embodiments described above have been directed to a method of zero adjustment in a combinatorial weighing system, the invention is not limited thereto. For example, the invention is applicable to zero adjustment in a combinatorial counting system which operated by weighing batches of articles by n weighing machines, dividing the respective measured weight values of the batches of articles by the unit weight of the articles to find the number of articles in each weighing machine, and computing combinations of these numbers. Further, the method of finding a combination for discharging articles by combinatorial computations in the embodiments described above is optional, and other methods may be used.

As for the timing for starting to feed articles to the weighing machines, two of the embodiments described above are adapted to impart discharge completion signals v produced by the weighing machines 1 to the feeders. However, it is not absolutely necessary that such signals be imparted from the weighing machines 1. For example, it may be so arranged that after discharge signals e are sent from the arithmetic unit 5, the latter send feed signals to the feeders 2 a predetermined period of time after the discharge is completed.

As many apparently widely different embodiments of this invention may be made without departing from the spirit and scope thereof, it is to be understood that the invention is not limited to the specific embodiments thereof except as defined in the appended claims.

We claim:

1. A method of zero adjustment for use with a combinatorial weighing or counting system which operates by weighing batches of articles on a plurality of weighing machines, computing combinations of the respective weight values of the batches of articles or combinations of the respective numbers of articles, converted from the respective weight values, in the batches, selecting a combination which is equal to or nearest a set value, and discharging the articles from the weighing machines corresponding to the selected combination, said method being characterized in that a selected one or more of said weighing machines will be zero adjusted after a predetermined number of measurements of weight for the entire system have been made.

2. The zero adjustment method of claim 1, wherein only one weighing machine is selected for being zero adjusted after said predetermined number of measurements of weight for the entire system have been made.

3. The zero adjustment method of claim 2, wherein a weight measurement cycle counter means is employed and set to a predetermined number for determining when to perform zero adjustment on one of said weighing machines.

4. The zero adjustment method of claim 3, wherein each weighing machine has a zero adjustment counter, a zero adjustment flag, and a supply flag for determining which of said weighing machines is to be zero adjusted.

5. The zero adjustment method of claim 4, including the following steps:

turning a supply flag to "H" on each weighing machine employed in the discharging step;

adding 1 to all zero adjustment counters corresponding with the weighing machines;

checking to determine if any of said zero adjustment flags indicates "H";

if one of said zero adjustment flags indicates "H", then zero adjusting the corresponding weighing machine, turning to "H" the supply flag of the weighing machine whose zero adjustment flag indicates "H,"

turning to "L" the zero adjustment flag of the weighing machine which has just been zero adjusted, if none of said zero adjustment flags indicates "H" or if the above zero adjusting step has been completed, then determining if the weight measurement cycle counter reads "zero"; and if the weight measurement cycle counter is not zero, then subtracting 1 from the weight measurement cycle counter and proceeding to supply articles to weighing machines whose supply flags indicate "H", and repeating the above described cycle.

6. The zero adjustment method of claim 5, wherein if the weight measurement cycle counter is zero, then turning to "H" the zero adjustment of the weighing machines having discharged articles whose zero adjustment counter has the maximum value, and turning to "L" the supply flag corresponding to the zero adjustment flag which indicates "H", clearing the zero adjustment counter corresponding to the zero adjustment flag which indicates "H", presetting the weight measurement cycle counter to a predetermined number, and then proceeding to supply articles to the weighing machines whose supply flags indicate "H", and repeating the above described cycle.

7. The zero adjustment as set forth in claim 6, including the steps of refilling the least filled weighing machine or machines of said weighing machines, and returning to the computing combinations steps, if the computed combinations do not fall within the permissible limits.

* * * * *